ROBERT BERRYMAN.
Improvement in Poppet Valves.
No. 125,525. Patented April 9, 1872.
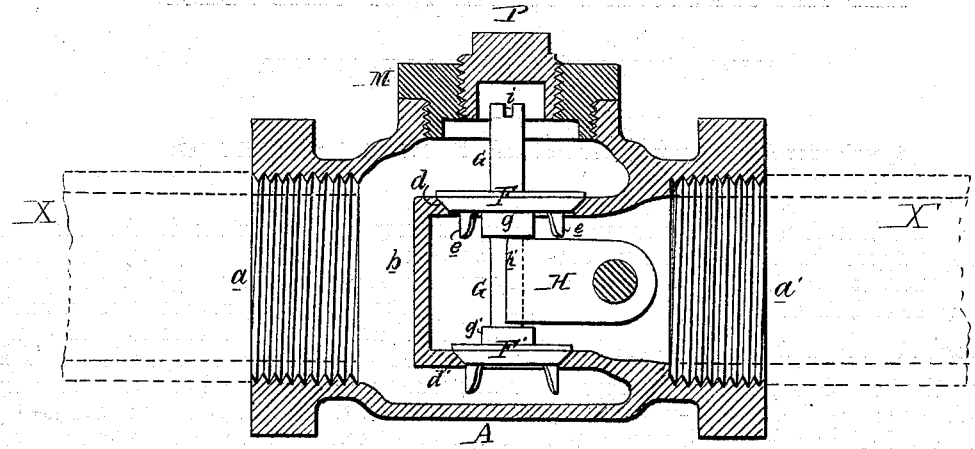
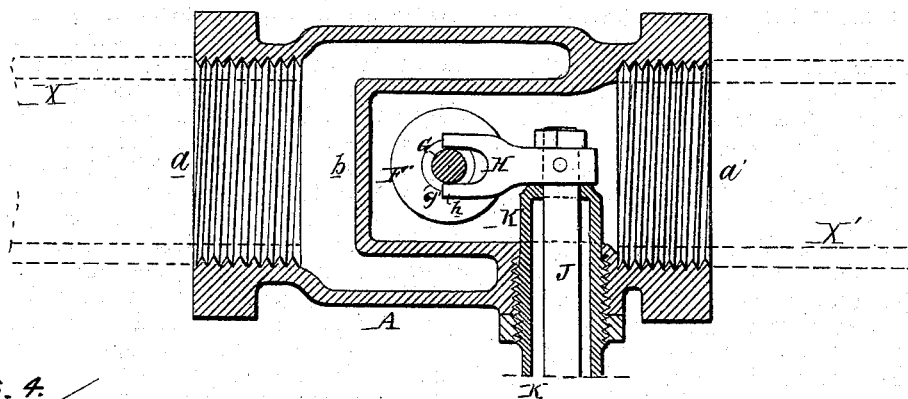
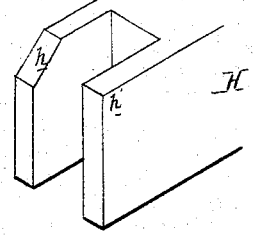
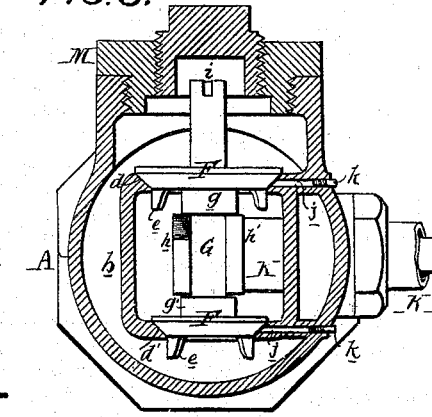
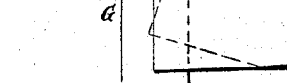
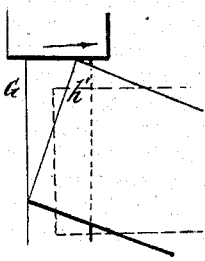

125,525

UNITED STATES PATENT OFFICE.

ROBERT BERRYMAN, OF HARTFORD, CONNECTICUT, ASSIGNOR TO BERRYMAN MANUFACTURING COMPANY, OF SAME PLACE.

IMPROVEMENT IN PUPPET-VALVES.

Specification forming part of Letters Patent No. 125,525, dated April 9, 1872.

Specification describing an Improvement in Balanced Puppet-Valves, invented by ROBERT BERRYMAN, of Hartford, county of Hartford, and State of Connecticut.

*Improvements in Balanced Puppet-Valves.*

My invention consists of certain improvements—fully described hereafter—in balanced puppet-valves, designed especially with the view of preventing undue wear of the valves and seats, and of enabling the same to be reground in without the usual necessity of detaching pipes, &c.

In the accompanying drawing, Figure 1 is a longitudinal section of my improved puppet-valve; Fig. 2, a sectional plan on the line 1 2, Fig. 1; Fig. 3, a transverse section on the line 3 4, Fig. 1; and Figs. 4, 5, and 6, detached views illustrating my method of operating the valve.

A represents the valve-chest K, having at its opposite ends internally-threaded branches $a$ and $a'$ for attachment to the supply and discharge pipes X and X', indicated by dotted lines. Within the chest is a casing, $b$, in which are two circular openings, beveled from above, as shown, so as to form seats $d$ and $d'$ for the valves F and F', the latter being furnished with guiding-projections $e$, and being secured to a spindle, G, so that they may be raised and lowered simultaneously by a forked arm, H, on a spindle, J, which turns in and is guided by a hollow stem, K, screwed into the side of the chest, and provided with a suitable stuffing-box. This tubular stem extends through the chest A and casing $b$, and affords a firm bearing for the spindles J without imparting to the latter undue friction. The forked arm H partly embraces the valve-spindle, and acts upon a collar, $g$, on the said spindle, in lifting the valves from their seats, and upon a collar, $g'$, in depressing the same.

The method of operating the valves by means of this forked arm is peculiar, and will be best understood on referring to Figs. 4, 5, and 6.

The finger $h$ of the forked arm has its upper corner beveled, as shown in Fig. 4, while the opposite finger $h'$ of the arm has a rectangular corner. The effect of this arrangement is to cause the lifting of the valves by the finger $h'$ only, the finger $h$ being sufficiently cut away to prevent it from striking the collar $g$ when the arm is turned upward. The finger $h'$, however, as it is raised, will strike the collar on one side of the spindle, and will lift, and at the same time turn to a limited extent, both spindle and valves in the direction of the arrow, Figs. 5 and 6, this turning taking place every time the valves are lifted, and tending to keep both the valves and their seats clean and to insure equal wear upon all portions of the same.

In lowering the valves it is important that they should be directed evenly and steadily to their seats, and to insure this the lower edges of the fingers $h$ and $h'$ of the operating-arm are made of equal length, so that they may press equally upon the collar $g'$ on both sides of the valve-spindles. In the top of the chest A there is a large opening, closed by a screw-cap, M, through which the valves and spindle may be introduced into and withdrawn from their places. As the unscrewing of this large cap for the purpose of obtaining access to the valves involves delay and tedious manipulation, a hole is formed in its center, to which is adapted a screw-plug, P, of sufficiently small diameter to enable it to be readily removed and replaced. This screw-plug, being adjustable can be used as a means of regulating the height to which the valves shall be raised from their seats; but its most important object is to enable the valves to be reground to their seats by turning them upon the latter by means of an instrument somewhat resembling a screw-driver, which is introduced through the opening in the cap M after removing the screw-plug, and fitted into a notch, $i$, in the upper end of the valve-spindle. A supply of emery and oil or other material to facilitate this grinding of the valves in their seats is introduced to the latter through small apertures or passages $j$ in the chest, (see Fig. 3,) which may be closed by screw-plugs $k$. The peculiar shape and arrangement of the operating-arm H permits the valve-spindle to be freely turned in thus regrinding the valves, so that the operation can be readily performed at any time without the necessity of detaching pipes or of taking the valve apart.

I claim as my invention—

1. The combination, with the valves and their spindle, of a forked operating-arm, H, having fingers h and h', constructed and operating on the said spindle and valves, substantially as described.

2. The combination, with a spindle, J, of an arm for operating the valves, and a tubular stem, K, secured to and extending through the side of the chest, and serving as a bearing for the said spindle, all substantially as specified.

3. The combination, with the valves and their spindle, of the plug P in the screw-cap, and apertures j j in the side of the chest and leading to the valve-seat, as and for the purpose specified.

In testimony whereof I have signed my name to this specification in the presence of two subscribing witnesses.

ROBERT BERRYMAN.

Witnesses:
WM. A. STEEL,
JOHN K. RUPERTUS.